United States Patent
Huang

(10) Patent No.: US 11,211,019 B2
(45) Date of Patent: *Dec. 28, 2021

(54) DRIVING METHOD FOR DISPLAY PANEL AND DISPLAY DEVICE

(71) Applicant: HKC Corporation Limited, Shenzhen (CN)

(72) Inventor: Bei Zhou Huang, Shenzhen (CN)

(73) Assignee: HKC CORPORATION LIMITED, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/771,881

(22) PCT Filed: Jan. 10, 2018

(86) PCT No.: PCT/CN2018/072074
§ 371 (c)(1),
(2) Date: Jun. 11, 2020

(87) PCT Pub. No.: WO2019/119561
PCT Pub. Date: Jun. 27, 2019

(65) Prior Publication Data
US 2021/0074230 A1     Mar. 11, 2021

(30) Foreign Application Priority Data

Dec. 18, 2017 (CN) .......................... 201711369031.4

(51) Int. Cl.
*G09G 3/36* (2006.01)
*G02F 1/1343* (2006.01)

(52) U.S. Cl.
CPC ..... *G09G 3/3614* (2013.01); *G09G 2300/0439* (2013.01); *G09G 2320/0242* (2013.01)

(58) Field of Classification Search
CPC ......... G09G 3/3614; G09G 2300/0439; G09G 2320/0242
See application file for complete search history.

(56) References Cited

U.S. PATENT DOCUMENTS

2016/0372076 A1* 12/2016 Koh ..................... G09G 3/3648
2017/0330520 A1* 11/2017 Tien .................... G09G 3/3648

* cited by examiner

*Primary Examiner* — David Tung
(74) *Attorney, Agent, or Firm* — WPAT, PC

(57) ABSTRACT

A driving method for a display panel and a display device are provided. The driving method includes adopting drive data of relatively high voltage and drive data of relatively low voltage respectively for driving any two adjacent pixels; and with three columns of pixels as a repeater, adopting a first polarity arrangement drive for pixels in a first column, and adopting a second polarity arrangement drive for the rest two columns of adjacent pixels; the first polarity arrangement drive is to perform positive polarity drive, negative polarity drive, negative polarity drive and positive polarity drive on four sub-pixels in the pixel respectively; and the second polarity arrangement drive is to perform negative polarity drive, positive polarity drive, positive polarity drive and negative polarity drive on four sub-pixels in the pixel respectively. The display device uses such a driving method.

20 Claims, 5 Drawing Sheets

First polarity arrangement | Second polarity arrangement | Second polarity arrangement | First polarity arrangement

DRIVING METHOD FOR DISPLAY PANEL AND DISPLAY DEVICE

CROSS REFERENCE OF RELATED APPLICATIONS

The disclosure claims the priority of the Chinese Patent Application No. 201711369031.4 titled "DRIVING METHOD FOR DISPLAY PANEL AND DISPLAY DEVICE" and filed to Patent Office of the People's Republic of China on Dec. 18, 2017, which is incorporated herein by reference in its entirety.

FIELD OF THE DISCLOSURE

The disclosure relates to the field of display technologies, and more particularly to a driving method for a display panel and a display device.

BACKGROUND

Large-sized liquid crystal display panels mostly adopt a vertical alignment (VA) type or an in plane switching (IPS) type. A VA type liquid crystal technology has the advantages of higher production efficiency and lower manufacturing cost compared with the IPS liquid crystal technology, but has relatively obvious optical property defects compared with the IPS liquid crystal technology, for example, the VA type liquid crystal display panel has color shift when a large-viewing angle image is presented.

When in image display, the brightness of a pixel should be linearly changed along with the change of a voltage in an ideal case, and a drive voltage of such pixel can accurately represent a gray scale of the pixel, which is embodied by the brightness. When a display adopting the VA type liquid crystal technology is viewed at a smaller viewing angle (for example, front viewing), the brightness of the pixel can meet an ideal case, i.e., is linearly changed along with the voltage. But when the display surface is viewed at a larger viewing angle (for example, more than 160 degrees relative to the display surface), the brightness of the pixel is fast saturated along with the voltage and then slowly changed due to the limitation of a principle of the VA type liquid crystal technology. Hence the gray scale that should be presented corresponding to the drive voltage at the large viewing angle is deviated severely, namely the color shift.

A method for reducing the color shift is to subdivide each sub-pixel into a main pixel and a secondary pixel, and then to drive the main pixel with a relatively high drive voltage and drive the secondary pixel with a relatively low drive voltage, and the main pixel and the secondary pixel display one sub-pixel together. Besides, when the relative high drive voltage and the relatively low drive voltage drive the main pixel and the secondary pixel, a relationship between the brightness and the corresponding gray scale at a front viewing angle can be kept unchanged, and the color shift at the large viewing angle can be reduced.

However, the above method has the problem that double metal wires and drive parts need to be provided to drive the secondary pixel, as a result, a light transmitting aperture region is sacrificed, a transmittance of the panel is affected, and the cost is higher.

SUMMARY

According to respective embodiments of the disclosure, a driving method for a display panel capable of reducing the condition of color shift at large-viewing angles without increasing a cost will be provided.

In addition, a display device is further provided.

According to the driving method for a display panel, the display panel includes a display array; the display array includes pixels arranged in an array; rows formed by first pixels and rows formed by second pixels are alternately disposed in a column direction; each of the first pixels includes a first sub-pixel, a second sub-pixel, a third sub-pixel and a fourth sub-pixel arranged sequentially in the row direction; each of the second pixels includes the third sub-pixel, the fourth sub-pixel, the first sub-pixel and the second sub-pixel arranged sequentially in the row direction; for the first pixels and the second pixels in a same column, the four sub-pixels of the first pixel and the four sub-pixels of the second pixel are respectively aligned in the column according to an arrangement sequence. The driving method includes adopting drive data of relatively high voltage and drive data of relatively low voltage respectively for driving any two adjacent pixels; and with three columns of pixels as a repeater, adopting a first polarity arrangement drive for pixels in the first column, and adopting a second polarity arrangement drive for the rest/other two columns of adjacent pixels; or adopting the first polarity arrangement drive for pixels in the first column and the second column, and adopting a second polarity arrangement drive for adjacent pixels in the rest one column.

The first polarity arrangement drive is to perform positive polarity drive, negative polarity drive, negative polarity drive and positive polarity drive on four sub-pixels in the pixel respectively.

The second polarity arrangement drive is to perform negative polarity drive, positive polarity drive, positive polarity drive and negative polarity drive on four sub-pixels in the pixel respectively.

In one of the embodiments, the rows formed by the first pixels are in odd numbered rows, and the rows formed by the second pixels are in even numbered rows; or the rows formed by the first pixels are in the even numbered rows, and the rows formed by the second pixels are in the odd numbered rows.

In one of the embodiments, the first sub-pixel, the second sub-pixel, the third sub-pixel and the fourth sub-pixel each correspondingly are a red sub-pixel, a green sub-pixel, a blue sub-pixel and a white sub-pixel.

In one of the embodiments, in the row direction, every two of the pixels form a pixel group, and the drive data displaying one of the pixels is converted to the drive data of the relatively high voltage and the drive data of the relatively low voltage to drive the pixel group.

In one of the embodiments, every two adjacent first pixel and second pixel form a pixel group, and the drive data displaying one of the pixels is converted to the drive data of the relatively high voltage and the drive data of the relatively low voltage to drive the pixel group.

In one of the embodiments, for each of the pixels, adopting the drive data of the relatively high voltage for driving is: a drive signal input to each sub-pixel of the pixels is higher than a threshold correspondingly set for each of the sub-pixels, and is selected from a first set range; and adopting the drive data of the relatively low voltage for driving is: the drive signal input to each of the sub-pixels of the pixels is lower than a threshold correspondingly set for each of the sub-pixels, and is selected from a second set range.

In one of the embodiments, the threshold correspondingly set for each of the sub-pixels includes a correspondingly input rated drive voltage value required for driving the sub-pixels to display a specific gray scale.

In one of the embodiments, the display panel is a liquid crystal panel.

A display device includes a display array and a drive module disposed to output drive data to cause the display array to display an image.

The display array includes pixels arranged in an array; rows formed by first pixels and rows formed by second pixels are alternately disposed in a column direction; each of the first pixels includes a first sub-pixel, a second sub-pixel, a third sub-pixel and a fourth sub-pixel arranged in sequence in the row direction; each of the second pixels includes the third sub-pixel, the fourth sub-pixel, the first sub-pixel and the second sub-pixel arranged in sequence in the row direction; for the first pixels and the second pixels in a same column, the four sub-pixels of the first pixel and the four sub-pixels of the second pixel are respectively aligned in the column according to an arrangement sequence.

The drive module is disposed to adopt drive data of a relatively high voltage and drive data of a relatively low voltage respectively for driving any adjacent two of the pixels.

With three columns of the pixels as a repeater, a first polarity arrangement drive is adopted for the pixels in a first column, and a second polarity arrangement drive is adopted for the pixels in other two adjacent columns; or the first polarity arrangement drive is adopted for the pixels in the first column and a second column, and the second polarity arrangement drive is adopted for the pixels in another one column.

The first polarity arrangement drive is to perform a positive polarity drive, a negative polarity drive, a negative polarity drive and a positive polarity drive on the four sub-pixels in one of the pixels respectively.

The second polarity arrangement drive is to perform a negative polarity drive, a positive polarity drive, a positive polarity drive and a negative polarity drive on the four sub-pixels in one of the pixels respectively.

In one of the embodiments, the rows formed by first pixels are in odd numbered rows, and the rows formed by second pixels are in even numbered rows; or the rows formed by the first pixels are in the even numbered rows, and the rows formed by the second pixels are in the odd numbered rows.

In one of the embodiments, the first sub-pixel, the second sub-pixel, the third sub-pixel and the fourth sub-pixel correspondingly are a red sub-pixel, a green sub-pixel, a blue sub-pixel and a white sub-pixel.

In one of the embodiments, in the row direction, every two of the pixels form a pixel group; the drive module outputs the drive data disposed to display one of the pixels converted to the drive data of the relatively high voltage and the drive data of the relatively low voltage to drive the pixel group.

In one of the embodiments, every two adjacent first pixel and second pixel form a pixel group; the drive module outputs the drive data disposed to display one of the pixels converted to the drive data of the relatively high voltage and the drive data of the relatively low voltage to drive the pixel group.

In one of the embodiments, for each of the pixels, adopting the drive data of the relatively high voltage for driving is: a drive signal input to each sub-pixel of the pixels is higher than a threshold correspondingly set for each of the sub-pixels, and is selected from a first set range; and adopting the drive data of the relatively low drive voltage for driving is: the drive signal input to each of the sub-pixels of the pixels is lower than a threshold correspondingly set for each of the sub-pixels, and is selected from a second set range.

In one of the embodiments, the threshold correspondingly set for each of the sub-pixels includes a correspondingly input rated drive voltage value required for driving the sub-pixels to display a specific gray scale.

In one of the embodiments, the display array is a liquid crystal display array.

In one of the embodiments, the rows formed by first pixels are in odd numbered rows, and the rows formed by second pixels are in even numbered rows; or the rows formed by the first pixels are in the even numbered rows, and the rows formed by the second pixels are in the odd numbered rows.

According to a driving method for a display panel, the display panel includes a display array; the display array includes pixels arranged in an array; rows formed by first pixels and rows formed by second pixels are alternately disposed in a column direction.

Each of the first pixels includes a red sub-pixel, a green second sub-pixel, a blue sub-pixel and a white sub-pixel arranged in sequence in the row direction.

Each of the second pixels includes the blue sub-pixel, the white sub-pixel, the red sub-pixel and the green sub-pixel arranged in sequence in the row direction.

For the first pixels and the second pixels in a same column, the four sub-pixels of the first pixel and the four sub-pixels of the second pixel are respectively aligned in the column according to an arrangement sequence; and the driving method includes adopting drive data of relatively high voltage and drive data of relatively low voltage respectively for driving any two adjacent pixels; and with three columns of pixels as a repeater, adopting a first polarity arrangement drive for pixels in the first column, and adopting a second polarity arrangement drive for the rest two columns of adjacent pixels; or adopting the first polarity arrangement drive for the pixels in the first column and a second column, and adopting the second polarity arrangement drive for the pixels in another one column.

The first polarity arrangement drive is to perform positive polarity drive, negative polarity drive, negative polarity drive and positive polarity drive on four sub-pixels in the pixel respectively.

The second polarity arrangement drive is to perform negative polarity drive, positive polarity drive, positive polarity drive and negative polarity drive on four sub-pixels in the pixel respectively.

In a row direction, every two pixels form a pixel group, and the drive data displaying one pixel is converted to the drive data of relatively high voltage and the drive data of relatively low voltage to drive the pixel group.

The display array is a liquid crystal display array.

According to the above method and device, the brightness of adjacent pixels can be averaged to obtain normal brightness display. Meanwhile, at large-viewing angles, the effect same as the solution adopting a main pixel/secondary pixel can be obtained, thereby reducing a color shift effect. Meanwhile, each sub-pixel has a size of normal sub-pixel without extra metal wires or drive elements, and the cost will not be increased. The four sub-pixels have the same amounts of high voltage positive polarity drive pixels and high voltage negative polarity drive pixels to ensure the number of sub-pixels having the high voltage positive polarity to match the number of sub-pixels with high voltage negative polarity whatever the color combination is, and the pixels with a same color have the same amount of the sub-pixels of the high voltage positive and negative polarities; with this drive, Vcom level is not affected, and levels of the sub-pixels in a same row relative to the Vcom are not affected to ensure the correctness of an image signal, and no phenomenon of color shift or picture quality abnormality occurs to ensure the problem of color shift to be solved by using the high voltage pixels and the low voltage pixels in space.

BRIEF DESCRIPTION OF THE DRAWINGS

In order to more clearly explain technical solutions in the disclosure or prior art, the drawings required in description of the embodiments or the prior art will be briefly introduced. Apparently, the described drawings below are just some embodiments of the disclosure, and a person skilled in the art can obtain the drawings of other embodiments according to these drawings without any inventive work.

DETAILED DESCRIPTION OF PREFERRED EMBODIMENTS

For the sake of understanding the disclosure, the disclosure will be thoroughly illustrated with reference to accompanying drawings as follows. The accompanying drawings show optional embodiments of the disclosure. However, the disclosure can be fulfilled by various forms, rather than restricting to the embodiments described in the disclosure. On the contrary, the objective to provide the embodiments is for better comprehension of disclosed contents of the disclosure.

Unless otherwise defined, all the technical and scientific terms used in the disclosure are equal to the conventional meaning understood by a person skilled in the art. The terms employed in the specification of the disclosure are purely for describing specific embodiments instead of limiting the disclosure. The term "and/or" in the disclosure includes any one or more of the listed subjects and all the combinations.

Display methods of respective embodiments will be explained by taking a liquid crystal display panel as an example. It is understandable that in other display technologies similar to liquid crystal display, the problem of color shift at large-viewing angles can also be solved by adopting the method.

Figure 1A:
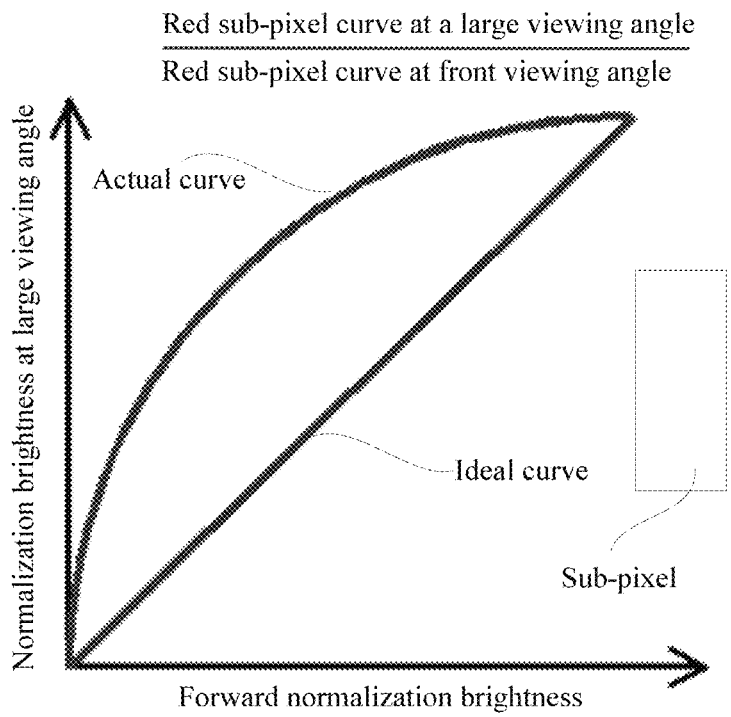
FIGS. 1a and 1b show relationships between a color shift curve and an ideal curve before and after improvement respectively.

When in image display, the brightness of a pixel should be linearly changed along with change of a voltage in an ideal case, and a drive voltage of such pixel can accurately represent a gray scale of the pixel, which is embodied by the brightness. As shown in FIG. 1a, when a display adopting the VA type liquid crystal technology is viewed by at a relatively small viewing angle (for example, front viewing), the brightness of the pixel can meet an ideal case, i.e., is linearly changed along with the voltage, as shown by an ideal curve in FIG. 1a. But when the display surface is viewed at a relatively large viewing angle (for example, more than 160 degrees relative to the display surface), the brightness of the pixel is firstly fast saturated along with the voltage and then slowly changed due to limitation of a principle of the VA type liquid crystal technology, as shown by an actual curve in FIG. 1a. Hence, the gray scale that should be presented corresponding to the drive voltage is deviated severely at the large viewing angle, namely the color shift.

Figure 1B:
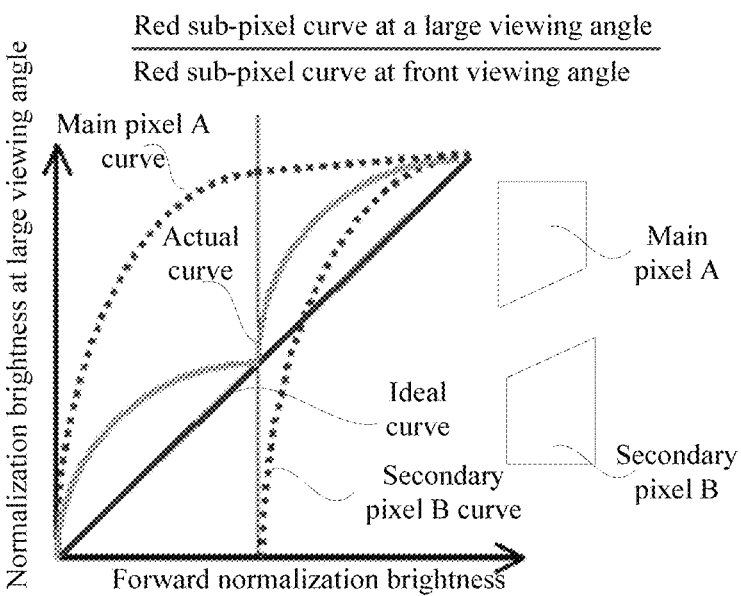

A traditional method for reducing the color shift is to subdivide each sub-pixel into a main pixel and a secondary pixel, and then drive the main pixel with a relatively high drive voltage and drive the secondary pixel with a relatively low drive voltage, and the main pixel and the secondary pixel display one sub-pixel together. Besides, when the relatively high drive voltage and the relatively low drive voltage drive the main pixel and the secondary pixel, a relationship between the brightness and the corresponding gray scale at a front viewing angle can be kept unchanged. Generally, the manner as shown in FIG. 1b is adopted, in a front half section of the gray scale, the main pixel is displayed by driving of the relatively high drive voltage and the secondary pixel is not displayed, and the brightness of the whole pixel is half of the brightness of the main pixel. In a later half section of the gray scale, the main pixel is displayed by driving of the relatively high drive voltage and the secondary pixel is displayed by driving of the relatively low drive voltage, and the brightness of the whole pixel is half of a sum of brightness of the main pixel and the brightness of the secondary pixel. In this way, after combination, the brightness curve at the large viewing angle is like the actual curve as shown in FIG. 1b, and is closer to the ideal curve, thus the color shift at the large viewing angle is reduced to some extent.

Figure 2:
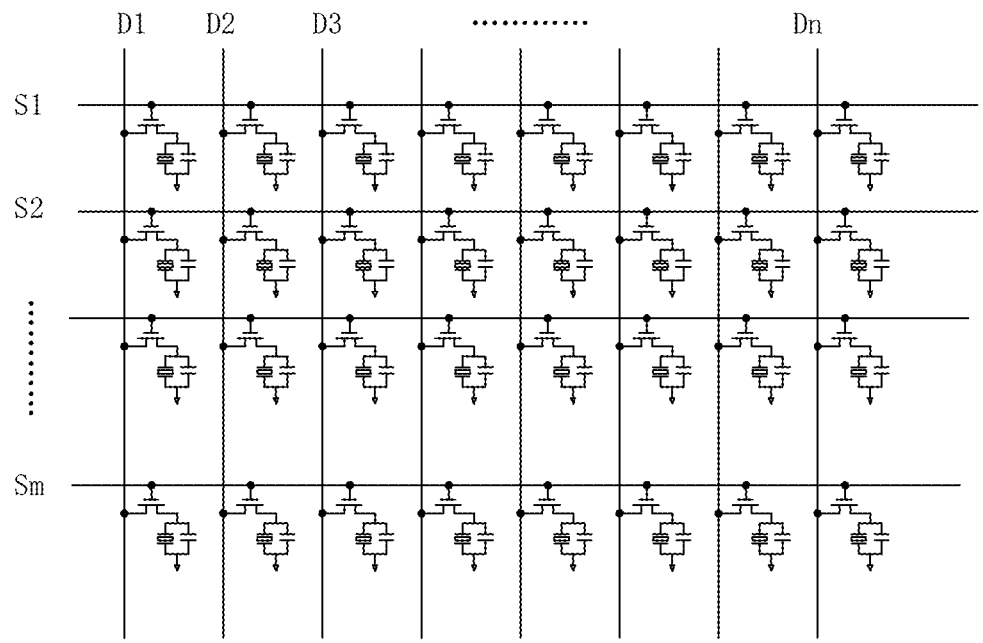
FIG. 2 is a schematic diagram of a liquid crystal drive structure.

FIG. 2 is a schematic diagram of a liquid crystal drive structure. In the liquid crystal drive structure, the multiple sub-pixel structures are arranged in an array, a scan signal Si ($1 \leq i \leq m$) is input in each row, and a data signal Dj ($1 \leq j \leq n$) is input in each column. Generally, the scan signal Si is input row by row, that is, a high level is input in sequence according to a fixed period from S1 to Sm, such that the sub-pixels in the row are input with the data signal. After the scan signal is completely input, display of a frame picture is finished. Generally, one frame scan time is $\frac{1}{60}$s, namely a refresh rate is 60 Hz.

Figure 3:
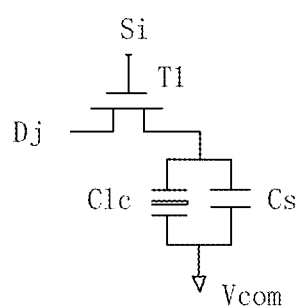
FIG. 3 is a schematic diagram of a sub-pixel structure.

FIG. 3 is a schematic diagram of a sub-pixel structure. The sub-pixel structure includes a trigistor T1, which generally is a thin film transistor, the scan signal Si is input to a gate electrode, the data signal Dj is input to a source electrode, and two parallel capacitors Cs and C1c are connected to a drain electrode, wherein the capacitor Cs is an energy-storage capacitor, and the capacitor C1c is a liquid crystal capacitor. The other end of the parallel capacitors may be connected to a common voltage Vcom.

When the high level is input to the scan signal Si, the thin film transistor T1 is turned on to receive the input data signal Dj (voltage signal). A voltage difference between the data signal Dj and the common voltage Vcom charges the capacitors Cs and C1c, wherein the voltage of the C1c redirects liquid crystal molecules therein, such that backlight transmits light of a corresponding degree according to a deflection degree of the liquid crystal molecules, thereby enabling the sub-pixel to present the corresponding brightness. The capacitor Cs is configured for keeping the voltage till the next scan comes.

A voltage of the data signal Dj may be higher than the common voltage Vcom, and may also be lower than the common voltage Vcom, and when absolute values of voltage differences of the two are the same but the values have opposite signs, the displayed brightness of the driven sub-pixels is same. When the voltage of the data signal Dj is higher than the common voltage Vcom, in the following embodiments, it is called as positive polarity drive, otherwise it is called as negative polarity drive.

Each sub-pixel structure is configured for driving and displaying a sub-pixel. For example, for a three-color pixel, the sub-pixels therein include a red sub-pixel (R), a green sub-pixel (G) and a blue sub-pixel (B). For a four-color pixel, sub-pixels therein include a red sub-pixel (R), a green sub-pixel (G), a blue sub-pixel (B) and a white sub-pixel (W).

Figure 4:
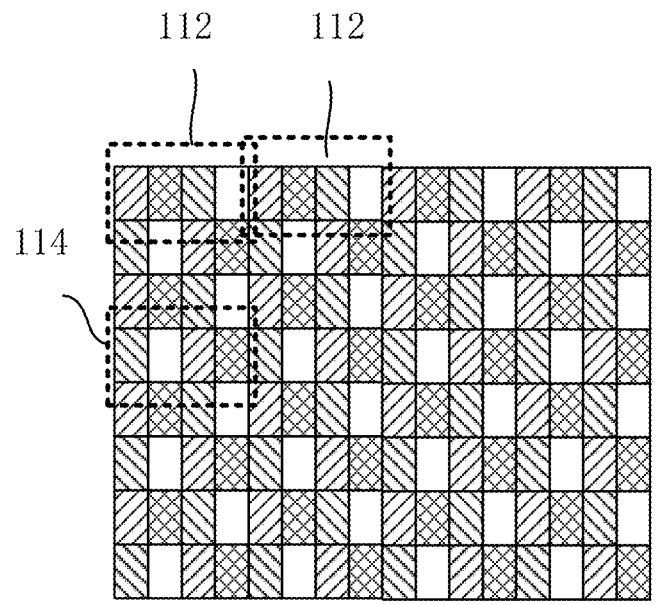
FIG. 4 is a structural schematic diagram of a display array.

The embodiment below provides a driving method for a display array. In the embodiment below, the sub-pixel structure is represented by a simplified box, and a type for driving and displaying the sub-pixel is marked in the box if necessary. The driving method is configured for driving a display array 100 as shown in FIG. 4.

In one embodiment, the display array 100 includes pixels arranged in an array (including first pixels 112 and second pixels 114). Wherein odd numbered rows such as the first, the third and the fifth rows consist of the first pixels 112, and even numbered rows such as the second, the fourth, and the sixth rows consist of the second pixels 114.

Figure 5A:
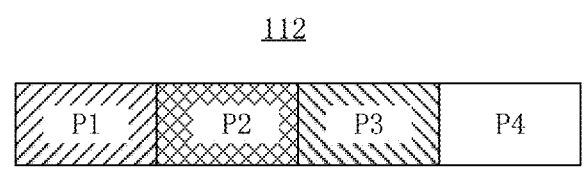
FIG. 5a is an arrangement structure of a first pixel.
Figure 5B:
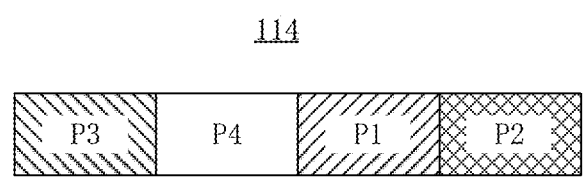
FIG. 5b is an arrangement structure of a second pixel.

In one embodiment, referring to FIG. 5a, the first pixel 112 includes a first sub-pixel P1, a second sub-pixel P2, a third sub-pixel P3 and a fourth sub-pixel P4 arranged in sequence in the row direction. Referring to FIG. 5b, the second pixel 114 includes the third sub-pixel P3, the fourth sub-pixel P4, the first sub-pixel P1 and the second sub-pixel P2 arranged in sequence in the row direction. In the display array 100, with respect to the first pixels 112 and the second pixels 114 in a same column, the four sub-pixels of the first pixel 112 and the four sub-pixels of the second pixel 114 are respectively aligned in the column according to an arrangement sequence.

Comprehensively, in other embodiments, the odd numbered rows may be formed by the second pixels 114, and the even numbered rows may be formed by the first pixels 112. In the embodiment above, the first sub-pixel, the second sub-pixel, the third sub-pixel and the fourth sub-pixel can respectively correspond to a red sub-pixel, a green sub-pixel, a blue sub-pixel and a white sub-pixel, but not limited thereto, other different relationships in arrangements and correspondences can also be adopted or other feasible sub-pixel solutions may be adopted.

Figure 6:
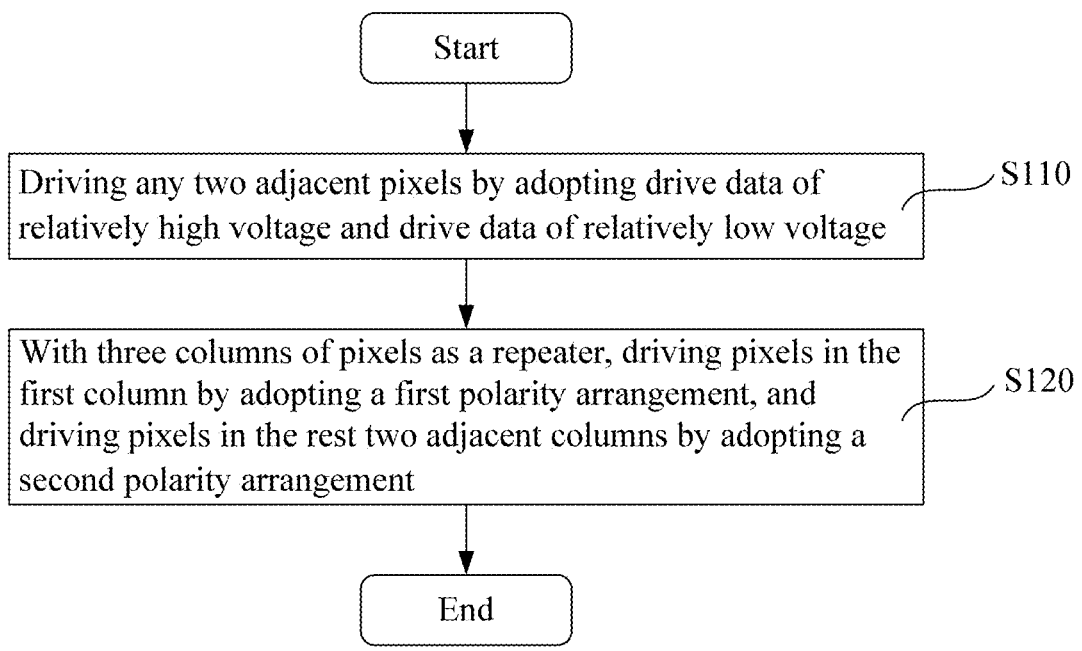
FIG. 6 is a flowchart of a driving method for a display array according to an embodiment.

As shown in FIG. 6, the driving method includes the following steps S110-S120.

Figure 7:
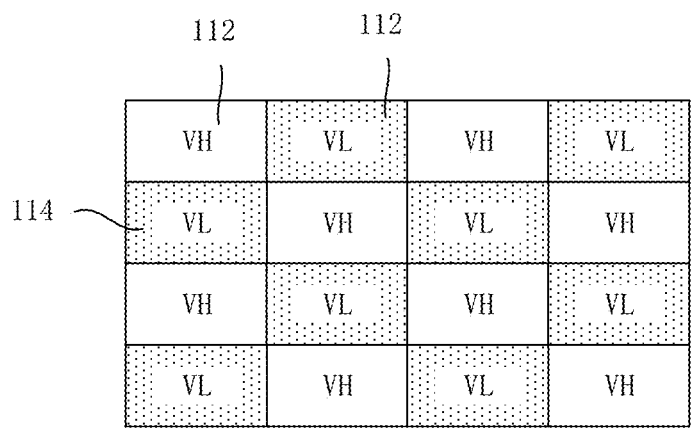
FIG. 7 depicts drive regions of a relatively high voltage and a relatively low voltage.

S110: any two adjacent pixels each are driven by adopting drive data of relatively high voltage and drive data of relatively low voltage. Referring to FIG. 7, in the row, the two adjacent first pixels 112 are driven by adopting drive data of a relatively high voltage VH and drive data of a relatively low voltage VL respectively, and in the column, the first pixels 112 and the second pixels 114 are driven by adopting the drive data of the relatively high voltage VH and the drive data of the relatively low voltage VL respectively. That is, for the whole liquid crystal display array, the drive data corresponding to any adjacent two pixels are a relatively high voltage and a relatively low voltage.

The drive data of relatively high voltage refers to a drive signal input aiming at the sub-pixel is higher than a set threshold in common for the driven pixel. The drive data of relatively low voltage refers to a drive signal input aiming at the sub-pixel is lower than a set threshold in common for the driven pixel. The threshold may be a corresponding value when one sub-pixel is normally driven.

It should be noted that for different gray scales, the threshold can be various. For example, when one sub-pixel is normally driven, if 0-255 gray scales are required to display, then the drive voltages of $V_0$~$V_{255}$ need to be input correspondingly, (that is, the input rated voltages required for driving the sub-pixel to display the 0-255 gray scales are $V_0$~$V_{255}$ respectively). If the threshold is set to be the voltage $V_k$ (0≤k≤255, k is an integer) for normally driving the sub-pixel, then when the pixel is driven by the drive data of relatively high voltage for displaying, in the present embodiment, the drive data includes 4 voltage values $V_{p1}$, $V_{p2}$, $V_{p3}$ and $V_{p4}$ for driving the first sub-pixel, the second sub-pixel, the third sub-pixel and the fourth sub-pixel, and each voltage should be higher than the corresponding voltage when the sub-pixel is normally driven. For example, the drive data corresponding to the pixel is (128, 255, 160 and 0), that is, the gray scale of the first sub-pixel is 128, the gray scale of the second sub-pixel is 255, the gray scale of the third sub-pixel is 160, and the gray scale of the fourth sub-pixel is 0, and then $V_{P1}$>$V_{128}$, $V_{P2}$>$V_{255}$, $V_{P3}$>$V_{160}$, $V_{P4}$>$V_0$. Similarly, the drive data of relatively low voltage refers to the drive voltage is lower than a corresponding voltage when one sub-pixel is normally driven in common.

By adopting the above driving method, the brightness of adjacent pixels can be averaged to obtain normal brightness display. Meanwhile, at large-viewing angles, the effect same as the solution adopting a main pixel/secondary pixel can be obtained, thereby achieving a color shift prevention effect. Meanwhile, each sub-pixel has a size of normal sub-pixel without extra metal wires and drive elements, and the cost will not be increased.

In one embodiment, for each pixel, adopting drive data of a relatively high voltage for driving includes: a drive signal input to each sub-pixel of the pixel is higher than a threshold correspondingly set for each sub-pixel, and is selected from a first set range, and adopting drive data of a relatively low voltage for driving includes: a drive signal input to each sub-pixel of the pixel is lower than a threshold correspondingly set for each sub-pixel, and is selected from a second set range.

During selecting from the first set range, the voltage needs to be ensured to be no higher than the highest voltage borne by each sub-pixel in normal working, to avoid damage to the sub-pixel caused by over high voltages. During selecting from the second set range, the voltage needs to be ensured to be no lower than the lowest voltage required for sub-pixels in normal working. Besides, a value of the drive data of high voltage and a value of the drive data of low voltage cause an integral display effect to comply with an expected effect.

In one embodiment, step S120, with three columns of pixels as a repeater, pixels in the first column are driven by adopting a first polarity arrangement, and pixels in the rest two adjacent columns are driven by adopting a second polarity arrangement; or pixels in the first column and the second column are driven by adopting the first polarity arrangement, and adjacent pixels in the rest column are driven by adopting the second polarity arrangement. The first polarity arrangement for driving is to perform positive polarity drive, negative polarity drive, negative polarity drive and positive polarity drive on four sub-pixels in the pixel respectively; and the second polarity arrangement for driving is to perform negative polarity drive, positive polarity drive, positive polarity drive and negative polarity drive on four sub-pixels in the pixel respectively.

When the drive display manner in the step S110 is adopted, there are many different sub-pixel polarity driving solutions, for example, frame inversion, row inversion, column inversion and dot inversion. An objective thereof is to avoid various problems caused by the liquid crystal molecules using the voltage in one direction for long term. The frame inversion refers to before and after switching of any two frames of images, the polarity of the drive voltage of each pixel (that is, a value of the voltage Dj of the drive signal relative to the common voltage Vcom) will be changed. The row inversion refers to the polarities of the drive voltages of pixels any two rows in a same frame are different. The column inversion refers to the polarities of the drive voltages of pixels in any two columns in a same frame are different. The dot inversion refers to that the polarities of the drive voltages of any two pixels in a same frame are different. The row inversion, the column inversion and the dot inversion all contain the fame inversion.

The dot inversion can solve the above problem to the upmost extent. Therefore, the dot inversion is generally adopted. But for a liquid crystal display manner adopting the driving manner in step S110, the dot inversion drive has a problem.

For example, if the same row is driven by a number of relatively high voltage sub-pixels, the sub-pixels driven by the low voltage are not displayed (that is, the gray scale is 0), at this point, the positive polarity voltage and the negative polarity voltage in the same row will be unbalanced. Due to an influence on a metal wire of the liquid crystal display from the stray capacitance, mismatch of the positive/negative polarities of high voltage will cause a Vcom level voltage to be affected by the stray capacitance. When the amount of the sub-pixels driven by the high voltage negative polarity is more than that of the sub-pixels driven by the high voltage positive polarity, a Vcom level equivalent voltage tends to be the negative polarity, that is, the level is reduced to be Vcom-ΔV relative to the original Vcom, and due to such result, actual charging charges representing the sub-pixels of high voltage positive polarity are increased and the brightness is increased, and on the contrary, actual charging charges representing the sub-pixels of high voltage negative polarity are reduced and the brightness is reduced.

Figures 8, 9:
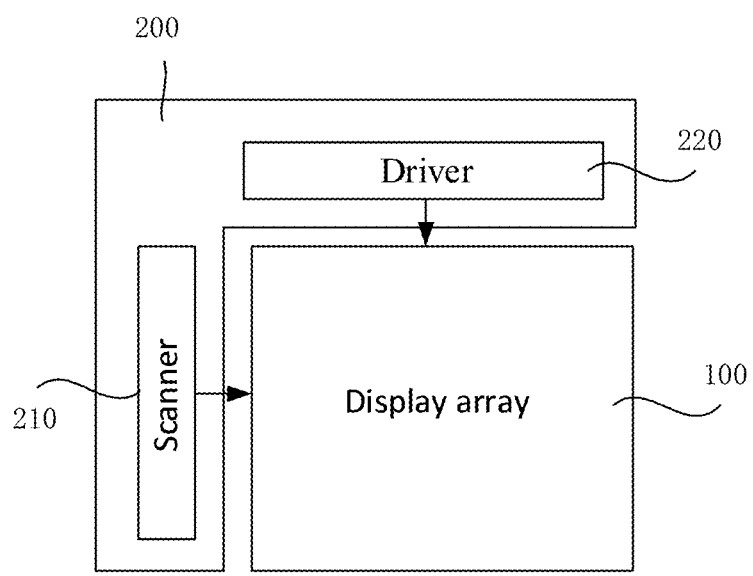
FIG. 8 is a polar drive arrangement manner corresponding to the display array in FIG. 4.
FIG. 9 is a module schematic diagram of a display device according to an embodiment.

Therefore, in the present embodiment, with three columns of pixels as a repeater, pixels in the first column are driven by adopting a first polarity arrangement, and adjacent pixels in the rest two columns are driven by adopting a second polarity arrangement. As shown in FIG. 8, for the first column, the first polarity arrangement drive is adopted, and for the second to third columns, the second polarity arrangement drive is adopted. Afterwards, three columns of pixels are periodically repeated, that is, the fourth column adopts the first polarity arrangement drive, the fifth to sixth columns adopt the second polarity arrangement drive, etc.

The first sub-pixel, the second sub-pixel, the third sub-pixel and the fourth sub-pixel respectively corresponding to the red sub-pixel (R), the green sub-pixel (G), the blue sub-pixel (B) and the while sub-pixel (W) will be taken an example for explanation. The first polarity arrangement drive is to perform positive polarity drive (+), negative polarity drive (−), negative polarity drive (−) and positive polarity drive (+) on four sub-pixels in the pixel respectively; and the second polarity arrangement drive is to perform negative polarity drive (−), positive polarity drive (+), positive polarity drive (+) and negative polarity drive (−) on four sub-pixels in the pixel respectively.

As shown in FIG. 8, in the first column and first row of pixels, the red sub-pixel is positive polarity drive (R+), the green sub-pixel is negative polarity drive (G−), the blue sub-pixel is negative polarity drive (B−) and the white sub-pixel is positive polarity drive (W+).

In the first column and second row of pixels, the blue sub-pixel is positive polarity drive (B+), the white sub-pixel is negative polarity drive (W−), the red sub-pixel is negative polarity drive (R−) and the green sub-pixel is positive polarity drive (G+).

The pixels in subsequent rows of the first column are repeated in the manner of the first row and the second row.

In the second column and first row of pixels, the red sub-pixel is negative polarity drive (R−), the green sub-pixel is positive polarity drive (G+), the blue sub-pixel is positive polarity drive (B+) and the white sub-pixel is negative polarity drive (W−).

In the second column and second row of pixels, the blue sub-pixel is negative polarity drive (B−), the white sub-pixel is positive polarity drive (W+), the red sub-pixel is positive polarity drive (R+) and the green sub-pixel is negative polarity drive (G−).

The pixels in subsequent rows of the second column are repeated in the manner of the first row and the second row.

In the third column and first row of pixels, the red sub-pixel is negative polarity drive (R−), the green sub-pixel is positive polarity drive (G+), the blue sub-pixel is positive polarity drive (B+) and the white sub-pixel is negative polarity drive (W−).

In the third column and second row of pixels, the blue sub-pixel is negative polarity drive (B−), the white sub-pixel is positive polarity drive (W+), the red sub-pixel is positive polarity drive (R+) and the green sub-pixel is negative polarity drive (G−).

The pixels in subsequent rows of the third column are repeated in the manner of the first row and the second row.

Afterwards, three columns of pixels are periodically repeated.

When the pixels in the first column and the second column adopt the first polarity arrangement drive, and the pixels in the rest one column adopt the second polarity arrangement drive, the manner above can be referred.

In this way, based on the step S110, the polarity arrangement drive of the step S120 are added, the four sub-pixels (RGBW) have the same amount of the pixels of high voltage positive polarity drive and the pixels of high voltage negative polarity drive to ensure the number of the sub-pixels having the high voltage positive polarity and the number of the sub-pixels having the high voltage negative polarity to be matched whatever the color combination is, and the pixels of a same color (R, G, B and W) each have the same amount of the sub-pixels of the high voltage positive and negative polarities, with this drive, the Vcom level is not affected, and levels of the sub-pixels in a same row relative to the Vcom are not affected to ensure correctness of an image signal, and no phenomenon of color shift or picture quality abnormality will occur to ensure the problem of color shift can be solved by using the high voltage pixels and the low voltage pixels in space.

In one of the embodiments, in a row direction, every two pixels form a pixel group, and the drive data displaying one pixel is converted to the relatively high voltage drive data and the relatively low voltage drive data for driving the pixel group.

In one of the embodiments, every two adjacent first pixel and second pixel form a pixel group, and the drive data displaying one pixel is converted to the relatively high voltage drive data and the relatively low voltage drive data for driving the pixel group.

Based on a same inventive concept, a display device will be provided below. As shown in FIG. 9, the display device includes a display array 100 and a drive module 200 as shown in FIG. 4. The display array 100 may be referred to the explanation in the above embodiments and will not be repeated herein. The display device may be a liquid crystal display device, and the display array 100 is a liquid crystal display array correspondingly.

The drive module 200 is configured for outputting drive data to cause the display array to display an image. The drive module 200 is configured for (1) adopting drive data of relatively high voltage and drive data of relatively low voltage respectively for driving any two adjacent pixels; and (2) with three columns of pixels as a repeater, adopting a first polarity arrangement drive for pixels in the first column therein, and adopting a second polarity arrangement drive for pixels in the rest two adjacent columns; or adopting the first polarity arrangement drive for pixels in the first column and the second column therein, and adopting the second polarity arrangement drive for pixels in the rest one column.

The first polarity arrangement drive is to perform positive polarity drive, negative polarity drive, negative polarity drive and positive polarity drive on four sub-pixels in the pixel respectively.

The second polarity arrangement drive is to perform negative polarity drive, positive polarity drive, positive polarity drive and negative polarity drive on four sub-pixels in the pixel respectively.

The drive module 200 may include a scanner 210 and a driver 220; the scanner 210 is configured for outputting a scan signal, generally is scanning the pixels row by row, and the driver 220 outputs a drive signal, such that the pixels receive drive data for display when being scanned.

Processing of the drive module 200 on the part (1) may be referred to the step S110 in the above embodiment. After the processing, the brightness of adjacent pixels can be averaged to obtain normal brightness display. Meanwhile, at large-viewing angles, the effect same as the solution adopting a main pixel/secondary pixel can be obtained, thereby achieving a color shift prevention effect. Meanwhile, each sub-pixel has a size of normal sub-pixel without extra metal wires and drive elements, and the cost will not be increased.

Processing of the drive module 200 on the part (2) may be referred to the step S120 in the above embodiment. Based on the step S110, the polarity drive arrangement of the step S120 is added, the four sub-pixels (RGBW) have the same amount of the pixels of high voltage positive polarity drive and the pixels of high voltage negative polarity drive to ensure the number of the sub-pixels having the high voltage positive polarity to match the number of sub-pixels with high voltage negative polarity whatever the color combination is, and the pixels with a same color (R, G, B and W) have the same amount of the sub-pixels of the high voltage positive and negative polarities; with this drive, the Vcom level will not be affected, and levels of the sub-pixels in a same row relative to the Vcom are not affected to ensure correctness of an image signal, and no phenomenon of color shift or picture quality abnormality occurs to ensure the problem of color shift can be solved by using the high voltage pixels and the low voltage pixels in space.

In one of the embodiments, in a row direction, every two pixels form a pixel group, and the drive module outputs the drive data disposed to display one pixel converted to the relatively high voltage drive data and the relatively low voltage drive data to drive the pixel group.

In one of the embodiments, every two adjacent first pixel and second pixel form a pixel group, and the drive module outputs the drive data disposed to display one pixel converted to the relatively high voltage drive data and the relatively low voltage drive data to drive the pixel group.

It should be explained that the display device for example is a liquid crystal display (LCD) device, an organic light-emitting diode (OLED) display device, a quantum dot light emitting diode (QLED) display device, a curve surface display device or other display devices.

Respective technical characteristics of above embodiments can be freely combined, and for the purpose of compact description, not all possible combinations of the respective technical characteristics of above embodiments are described. However, as long as the combinations of these technical characteristics have no conflicts, they are considered to be within a scope of the specification.

The foregoing merely expresses several embodiments of the disclosure described in a relatively specific and detailed manner, but should not be understood as a limitation to the scope of the disclosure. It should be pointed out that a person skilled in the art could make a number of transformations and improvements without departing from a concept of the disclosure, and they all fall within the protective scope of the disclosure. Therefore, a protective scope of the disclosure should take appended claims as a criterion.

What is claimed is:

1. A driving method for a display panel, wherein the display panel comprises a display array, the display array comprises pixels arranged in an array, rows formed by first pixels and rows formed by second pixels are alternately disposed in a column direction;
    wherein each of the first pixels comprises a first sub-pixel, a second sub-pixel, a third sub-pixel and a fourth sub-pixel arranged sequentially in a row direction;
    wherein each of the second pixels comprises the third sub-pixel, the fourth sub-pixel, the first sub-pixel and the second sub-pixel arranged sequentially in the row direction;
    wherein with regard to the first pixels and the second pixels in a same column, four sub-pixels of the first pixel and four sub-pixels of the second pixel are respectively aligned in columns according to an arrangement sequence; the driving method comprises:
    adopting drive data of a relatively high voltage and drive data of a relatively low voltage respectively for driving any adjacent two of the pixels; and
    with successively-arranged three columns of the pixels as a repeater, adopting a first polarity arrangement drive for the pixels in a first column, and adopting a second polarity arrangement drive for pixels in each of other two adjacent columns located at a same side of the first column; or adopting the second polarity arrangement drive for the pixels in the first column, and adopting the first polarity arrangement drive for pixels in each of the other two adjacent columns;
    wherein the first polarity arrangement drive is to perform a positive polarity drive, a negative polarity drive, a negative polarity drive and a positive polarity drive on the four sub-pixels in one of the pixels respectively;

wherein the second polarity arrangement drive is to perform a negative polarity drive, a positive polarity drive, a positive polarity drive and a negative polarity drive on the four sub-pixels in one of the pixels respectively.

2. The driving method for a display panel according to claim 1, wherein the rows formed by the first pixels are in odd numbered rows, and the rows formed by the second pixels are in even numbered rows; or the rows formed by the first pixels are in the even numbered rows, and the rows formed by the second pixels are in the odd numbered rows.

3. The driving method for a display panel according to claim 1, wherein the first sub-pixel, the second sub-pixel, the third sub-pixel and the fourth sub-pixel each correspondingly are a red sub-pixel, a green sub-pixel, a blue sub-pixel and a white sub-pixel.

4. The driving method for a display panel according to claim 1, wherein in the row direction, every two of the pixels form a pixel group, and the drive data displaying one of the pixels is converted to the drive data of the relatively high voltage and the drive data of the relatively low voltage to drive the pixel group.

5. The driving method for a display panel according to claim 1, wherein every two adjacent first pixel and second pixel form a pixel group, and the drive data displaying one of the pixels is converted to the drive data of the relatively high voltage and the drive data of the relatively low voltage to drive the pixel group.

6. The driving method for a display panel according to claim 1, wherein for each of the pixels, adopting the drive data of the relatively high voltage for driving is: a drive signal input to each sub-pixel of the pixels is higher than a threshold correspondingly set for each of the sub-pixels, and is selected from a first set range; and adopting the drive data of the relatively low voltage for driving is: the drive signal input to each of the sub-pixels of the pixels is lower than a threshold correspondingly set for each of the sub-pixels, and is selected from a second set range.

7. The driving method for a display panel according to claim 6, wherein the threshold correspondingly set for each of the sub-pixels comprises a correspondingly input rated drive voltage value required for driving the sub-pixels to display a specific gray scale.

8. The driving method for a display panel according to claim 1, wherein the display panel is a liquid crystal panel.

9. The driving method for a display panel according to claim 1, wherein the adopting drive data of a relatively high voltage and drive data of a relatively low voltage respectively for driving any adjacent two of the pixels comprises:
adopting the drive data of the relatively high voltage for driving all the first through fourth sub-pixels in one of the first pixels, and
adopting the drive data of the relatively low voltage for driving all the first through fourth sub-pixels in one of the second pixels adjacent to the one of the first pixels.

10. A display device comprising
a display array, comprising pixels arranged in an array, wherein rows formed by first pixels and rows formed by second pixels are alternately disposed in a column direction; each of the first pixels comprises a first sub-pixel, a second sub-pixel, a third sub-pixel and a fourth sub-pixel arranged in sequence in a row direction; each of the second pixels comprises the third sub-pixel, the fourth sub-pixel, the first sub-pixel and the second sub-pixel arranged in sequence in the row direction; with regard to the first pixels and the second pixels in a same column, four sub-pixels of the first pixel and the four sub-pixels of the second pixel are respectively aligned in columns according to an arrangement sequence; and
a drive module, disposed to output drive data to cause the display array to display an image, wherein the drive module is disposed to:
adopt drive data of a relatively high voltage and drive data of a relatively low voltage respectively for driving any adjacent two of the pixels;
with three columns of the pixels as a repeater comprising a first column of pixels, a second column of pixels, and a third column of pixels successively arranged in the row direction in that order, adopt a first polarity arrangement drive for the pixels in the first column, and adopting a second polarity arrangement drive for the pixels in each of the second column and the third column; or adopt the first-polarity arrangement drive for the pixels in each of the first column and the second column, and adopting the second polarity arrangement drive for the pixels in the third column;
wherein the first polarity arrangement drive is to perform a positive polarity drive, a negative polarity drive, a negative polarity drive and a positive polarity drive on the four sub-pixels in the pixel respectively; and
wherein the second polarity arrangement drive is to perform a negative polarity drive, a positive polarity drive, a positive polarity drive and a negative polarity drive on the four sub-pixels in the pixel respectively.

11. The driving device according to claim 10, wherein the first sub-pixel, the second sub-pixel, the third sub-pixel and the fourth sub-pixel correspondingly are a red sub-pixel, a green sub-pixel, a blue sub-pixel and a white sub-pixel.

12. The driving device according to claim 10, wherein in the row direction, every two of the pixels form a pixel group; the drive module outputs the drive data disposed to display one of the pixels converted to the drive data of the relatively high voltage and the drive data of the relatively low voltage to drive the pixel group.

13. The driving device according to claim 10, wherein every two adjacent first pixel and second pixel form a pixel group; the drive module outputs the drive data disposed to display one of the pixels converted to the drive data of the relatively high voltage and the drive data of the relatively low voltage to drive the pixel group.

14. The driving device according to claim 10, wherein for each of the pixels, adopting the drive data of the relatively high voltage for driving is: a drive signal input to each sub-pixel of the pixels is higher than a threshold correspondingly set for each of the sub-pixels, and is selected from a first set range; and adopting the drive data of the relatively low drive voltage for driving is: the drive signal input to each of the sub-pixels of the pixels is lower than a threshold correspondingly set for each of the sub-pixels, and is selected from a second set range.

15. The driving device according to claim 14, wherein the threshold correspondingly set for each of the sub-pixels comprises a correspondingly input rated drive voltage value required for driving the sub-pixels to display a specific gray scale.

16. The driving device according to claim 10, wherein the display array is a liquid crystal display array.

17. The driving device according to claim 10, wherein the rows formed by first pixels are in odd numbered rows, and the rows formed by second pixels are in even numbered rows; or the rows formed by the first pixels are in the even numbered rows, and the rows formed by the second pixels are in the odd numbered rows.

18. The display device according to claim 10, wherein a brightness of the first sub-pixel in the one of the first pixels is greater than that of the first sub-pixel in the one of the second pixels adjacent to the one of the first pixels, a brightness of the second sub-pixel in the one of the first pixels is greater than that of the second sub-pixel in the one of the second pixels adjacent to the one of the first pixels, a brightness of the third sub-pixel in the one of the first pixels is greater than that of the third sub-pixel in the one of the second pixels adjacent to the one of the first pixels, and a brightness of the fourth sub-pixel in the one of the first pixels is greater than that of the fourth sub-pixel in the one of the second pixels adjacent to the one of the first pixels.

19. A driving method for a display panel, wherein the display panel comprises a display array, the display array comprises pixels arranged in an array, rows formed by first pixels and rows formed by second pixels are alternately disposed in a column direction;
  wherein each of the first pixels comprises a red sub-pixel, a green sub-pixel, a blue sub-pixel and a white sub-pixel arranged sequentially in a row direction;
  wherein each of the second pixels comprises the blue sub-pixel, the white sub-pixel, the red sub-pixel and the green sub-pixel arranged sequentially in the row direction;
  wherein with regard to the first pixels and the second pixels in a same column, four sub-pixels of the first pixel and the four sub-pixels of the second pixel are respectively aligned in columns according to an arrangement sequence; the driving method comprises:
  adopting drive data of a relatively high voltage and drive data of a relatively low voltage respectively for driving any adjacent two of the pixels; and
  with three columns of the pixels as a repeater comprising a first column of pixels, a second column of pixels, and a third column of pixels successively arranged in the row direction in that order, adopting a first polarity arrangement drive for the pixels in the first column, and adopting a second polarity arrangement drive for the pixels in each of the second column and the third column; or adopting the first polarity arrangement drive for the pixels in each of the first column and a second column, and adopting the second polarity arrangement drive for the pixels in the third column;
  wherein the first polarity arrangement drive is to perform a positive polarity drive, a negative polarity drive, a negative polarity drive and a positive polarity drive on the four sub-pixels in one of the pixels respectively;
  wherein the second polarity arrangement drive is to perform a negative polarity drive, a positive polarity drive, a positive polarity drive and a negative polarity drive on the four sub-pixels in one of the pixels respectively;
  wherein in the row direction, every two of the pixels form a pixel group, and the drive data displaying one of the pixels is converted to the drive data of the relatively high voltage and the drive data of the relatively low voltage to drive the pixel group;
  wherein the display array is a liquid crystal display array.

20. The driving method for a display panel according to claim 19, wherein a brightness of the red sub-pixel in the one of the first pixels is greater than that of the red sub-pixel in the one of the second pixels adjacent to the one of the first pixels, a brightness of the green sub-pixel in the one of the first pixels is greater than that of the green sub-pixel in the one of the second pixels adjacent to the one of the first pixels, a brightness of the blue sub-pixel in the one of the first pixels is greater than that of the blue sub-pixel in the one of the second pixels adjacent to the one of the first pixels, and a brightness of the white sub-pixel in the one of the first pixels is greater than that of the white sub-pixel in the one of the second pixels adjacent to the one of the first pixels.

* * * * *